US010631242B2

(12) United States Patent
Cannizzaro et al.

(10) Patent No.: US 10,631,242 B2
(45) Date of Patent: Apr. 21, 2020

(54) ON-DEMAND WIRELESS SIGNAL (71) Applicant: International Business Machines Corporation, Armonk, NY (US)

(72) Inventors: Giovanna Cannizzaro, Rome (IT); Patrizia Manganelli, Rome (IT); Elisa Matteagi, Rome (IT); Alessandro Raniolo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/950,348

(22) Filed: Nov. 24, 2015

(65) Prior Publication Data
US 2017/0150437 A1 May 25, 2017

(51) Int. Cl.
*H04W 52/02* (2009.01)
(52) U.S. Cl.
CPC ....... *H04W 52/0206* (2013.01); *Y02D 70/142* (2018.01); *Y02D 70/144* (2018.01); *Y02D 70/164* (2018.01); *Y02D 70/166* (2018.01)
(58) Field of Classification Search
None
See application file for complete search history.

(56) References Cited

U.S. PATENT DOCUMENTS

| 5,491,721 | A | 2/1996 | Cornelius et al. |
| 6,742,186 | B1 | 5/2004 | Roeck |
| 8,611,268 | B1* | 12/2013 | Thandaveswaran .................. H04W 52/0206 370/311 |
| 2003/0027607 | A1* | 2/2003 | Hatakeyama ....... H04M 1/6066 455/569.2 |
| 2006/0075269 | A1* | 4/2006 | Liong ................... G06F 1/3209 713/300 |
| 2007/0147318 | A1* | 6/2007 | Ross ..................... H04L 63/104 370/338 |

(Continued)

FOREIGN PATENT DOCUMENTS

| CN | 103297333 A | 9/2013 |
| CN | 203180952 U | 9/2013 |

(Continued)

OTHER PUBLICATIONS

Sivaraman et al., "Greening Residential Wi-Fi Networks under Centralized Control", IEEE Transactions on Mobile Computing, vol. 14, No. 3, Mar. 2015, pp. 552-564.

*Primary Examiner* — Christopher T Wyllie
(74) *Attorney, Agent, or Firm* — Brian M. Restauro; William H. Hartwell (57) ABSTRACT

A method for providing on-demand wireless signals. The method includes activating a wireless connectivity feature of a wireless transmission device. The wireless transmission device then determines that no wireless devices within range of the wireless transmission device are connected to or attempting to connect to a computer network using the wireless connectivity feature of the wireless transmission device. Upon determining that no wireless devices within range of the wireless transmission device are connected to or attempting to connect to the network using the wireless connectivity feature of the wireless transmission device, the wireless transmission device then deactivates the wireless connectivity feature of the wireless transmission device.

18 Claims, 4 Drawing Sheets

(56) References Cited

U.S. PATENT DOCUMENTS

| | | | | |
|---|---|---|---|---|
| 2008/0170549 A1* | 7/2008 | Everson | ........... | H04W 12/08 |
| | | | | 370/338 |
| 2010/0246461 A1* | 9/2010 | Hsieh | ........... | H04W 52/0274 |
| | | | | 370/311 |
| 2010/0284316 A1* | 11/2010 | Sampathkumar | ........... | |
| | | | | H04W 52/0216 |
| | | | | 370/311 |
| 2011/0230225 A1* | 9/2011 | Yokoyama | ........... | H04W 52/26 |
| | | | | 455/522 |
| 2012/0315885 A1* | 12/2012 | Shintani | ........... | H04W 60/02 |
| | | | | 455/418 |
| 2013/0039239 A1* | 2/2013 | Lin | ........... | H04W 52/0229 |
| | | | | 370/311 |
| 2014/0233467 A1 | 8/2014 | Vandwalle et al. | | |
| 2014/0370909 A1* | 12/2014 | Natucci, Jr. | ........... | H04W 52/0251 |
| | | | | 455/456.1 |
| 2015/0139051 A1* | 5/2015 | Gonia | ........... | H04W 52/0229 |
| | | | | 370/311 |
| 2015/0163744 A1* | 6/2015 | Suh | ........... | H04W 52/0235 |
| | | | | 370/311 |
| 2017/0019853 A1* | 1/2017 | Ghosh | ........... | H04W 52/0216 |
| 2017/0026889 A1* | 1/2017 | Tsuda | ........... | H04W 52/0206 |
| 2017/0094595 A1* | 3/2017 | Radhakrishnan | ........... | |
| | | | | H04W 52/0209 |

FOREIGN PATENT DOCUMENTS

| | | |
|---|---|---|
| WO | 2013042100 A1 | 3/2013 |
| WO | 2013102694 A1 | 7/2013 |

\* cited by examiner

ON-DEMAND WIRELESS SIGNAL

BACKGROUND

The present invention relates generally to the field of energy conservation, and more particularly to the conservation of wireless signals.

Wi-Fi, also referred to as WiFi, is a local area wireless computer networking technology that allows electronic devices to communicate over a wireless local area network (WLAN). Many devices today use Wi-Fi, for example, personal computers, video-game consoles, smartphones, digital cameras, tablet computers and digital audio players. Wi-Fi enabled devices can connect to a network resource such as the Internet via a wireless network access point, also referred to as a hotspot. Typical access points, or hotspots, may have a range of about 20 meters (i.e., 66 feet), indoors and a greater range outdoors. Hotspot coverage may be as small as a single room with walls that block radio waves, or as large as many square kilometers achieved by using multiple overlapping access points.

SUMMARY

Embodiments of the present invention disclose a method, computer program product, and system for providing on-demand wireless signals. The method includes activating a wireless connectivity feature of a wireless transmission device. The wireless transmission device then determines that no wireless devices within range of the wireless transmission device are connected to or attempting to connect to a computer network using the wireless connectivity feature of the wireless transmission device. Upon determining that no wireless devices within range of the wireless transmission device are connected to or attempting to connect to the network using the wireless connectivity feature of the wireless transmission device, deactivating the wireless connectivity feature of the wireless transmission device.

DETAILED DESCRIPTION

Embodiments in accordance with the present invention recognize that wireless transmission devices, such as Wi-Fi modems, are widely used in many homes today to allow wireless devices, such as smartphones, tablets, personal computers (PCs), Smart-TVs, game consoles, and printers, to connect to the Internet in a wireless mode. Embodiments in accordance with the present invention also recognize that users of Wi-Fi modems may not want wireless signals propagating continuously. For example, a user of a Wi-Fi modem may only want the Wi-Fi modem to transmit wireless signals when a device requires a connection to the Internet. In another example, a user of a Wi-Fi modem may want to switch off the wireless signal at night and then switch the wireless signal back on in the morning without manual intervention. Embodiments in accordance with the present invention also recognize the energy cost savings benefits of a Wi-Fi modem that allows a user to configure time periods when the wireless signal, also referred to as a wireless connectivity feature, may be turned on or reactivated, or turn on the wireless signal when a device requires an Internet connection.

Figure 1:
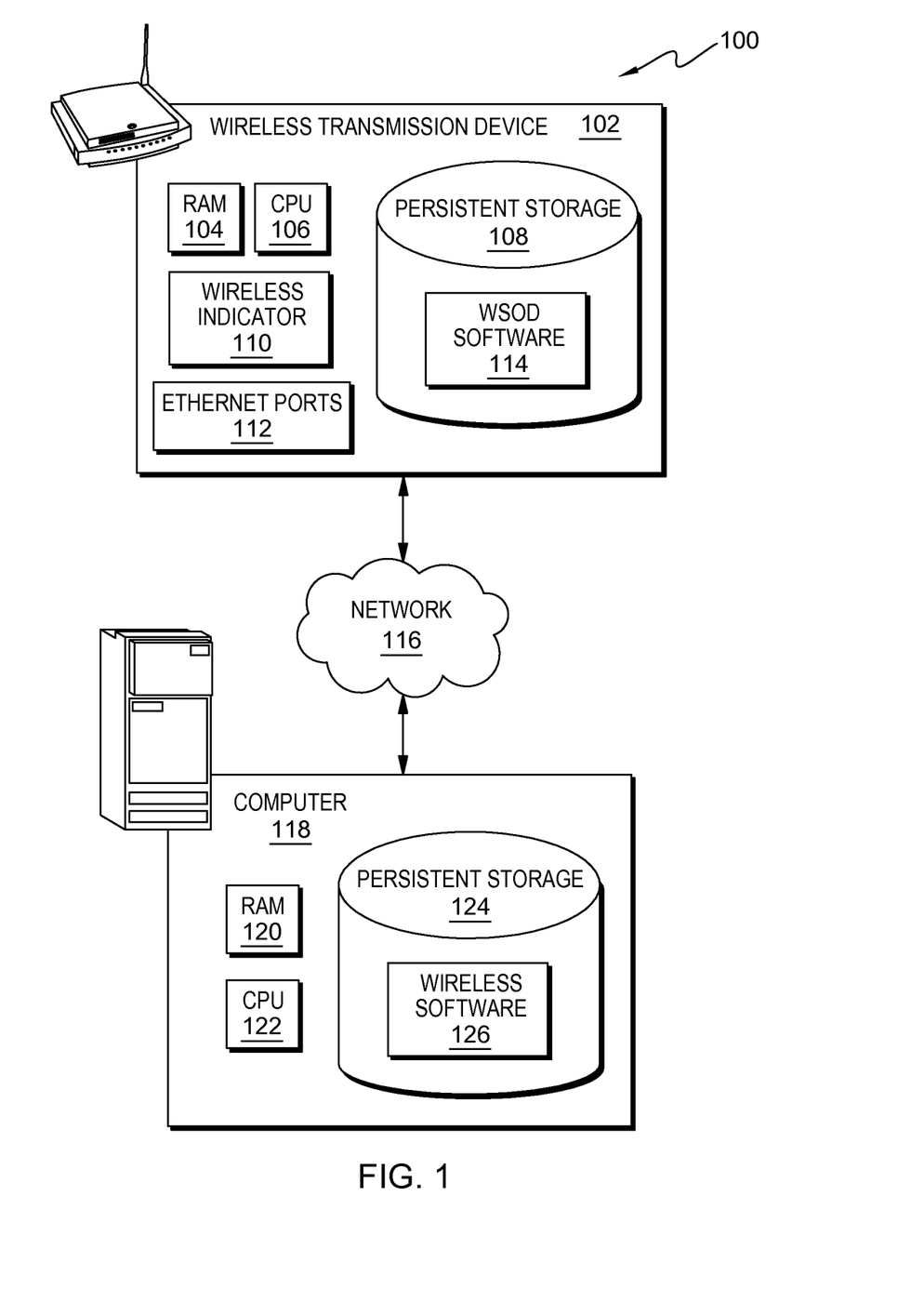
FIG. 1 is a functional block diagram illustrating a wireless networking environment, in an embodiment in accordance with the present invention.

Embodiments in accordance with the present invention will now be described in detail with reference to the Figures. FIG. 1 is a functional block diagram, generally designated 100, illustrating a wireless networking environment, in an embodiment in accordance with the present invention.

Wireless networking environment 100 includes wireless transmission device 102 and computer 118, all interconnected over network 116. Wireless transmission device 102 includes random access memory (RAM) 104, central processing unit (CPU) 106, persistent storage 108, wireless indicator 110, and Ethernet ports 112. Wireless transmission device 102 may be a wireless access point (WAP), a wireless router, a wireless digital subscriber line (DSL) modem, or any other device capable of providing wireless access to network resources. In computer networking, a WAP, also referred to as a residential gateway, is a device that allows wireless devices to connect to a wired network using Wi-Fi, or related standards. A wireless router is a device that performs the functions of a router and also includes the functions of a wireless access point. A digital subscriber line (DSL) modem, also referred to as a DSL broadband modem, is a device used to connect a computing device to a telephone line which provides the digital subscriber line service for connectivity to the Internet. In some embodiments, wireless transmission device 102 may be a laptop computer, a tablet computer, a netbook computer, a personal computer (PC), a desktop computer, a personal digital assistant (PDA), a smart phone, or any programmable electronic device capable of providing a wireless data connection to one or more wireless computing devices on network 116.

In an alternate embodiment, a plurality of wireless transmission devices 102 may be used in a local area network (LAN) and managed by a wireless LAN (WLAN) controller providing wireless access to a local LAN throughout large or regional office locations. The WAPs may be managed by the WLAN controller that handles automatic adjustments to radio frequency (RF) power, channels, authentication, and security.

Figure 4:
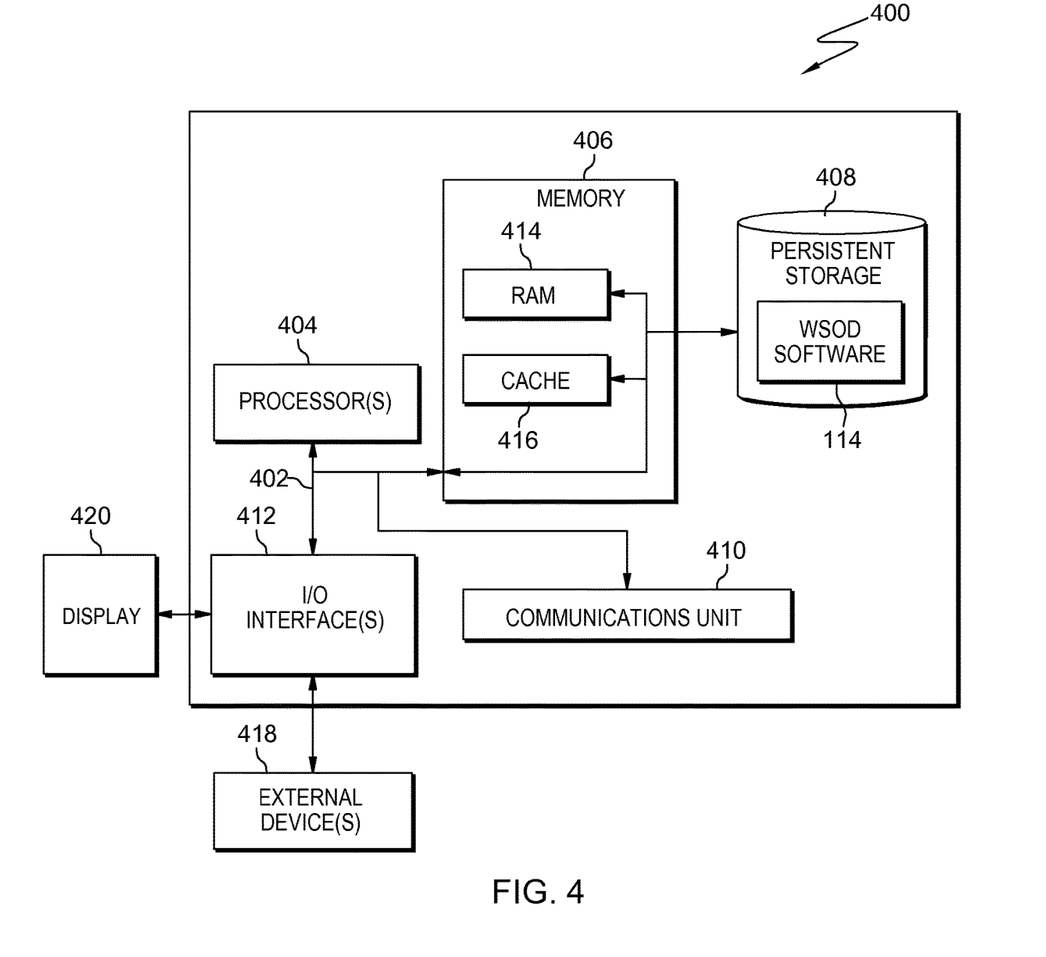
FIG. 4 depicts a block diagram of components of the wireless transmission device executing the on-demand wireless signal software, in an embodiment in accordance with the present invention.

Wireless transmission device 102 may include internal and external hardware components, as depicted and described in further detail with respect to FIG. 4.

In FIG. 1, network 116 is shown as the interconnecting fabric between wireless transmission device 102 and computer 118. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between wireless transmission device 102 and computer 118.

Computer 118 is included in wireless networking environment 100. Computer 118 includes user random access memory (RAM) 120, central processing unit (CPU) 122, and persistent storage 124. Computer 118 may be a Web server, or any other electronic device or computing system, capable of processing program instructions and receiving and sending data. In some embodiments, computer 118 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, computer 118 may represent server computing systems utilizing multiple computers as a server system, such as in a distributed computing environment. In general, computer 118 is representative of any electronic devices or combinations of electronic devices capable of executing machine-readable program instructions and communicating with wireless transmission device 102 via network 116 and with various components and devices (not shown) within wireless networking environment 100.

Computer 118 includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information. Wireless software 126 is stored in persistent storage 124, which also includes operating system software, as well as software that enables computer 118 to detect and establish a connection to wireless transmission device 102, and communicate with other computing devices (not shown) of wireless networking environment 100 over a data connection on network 116.

Figure 2:
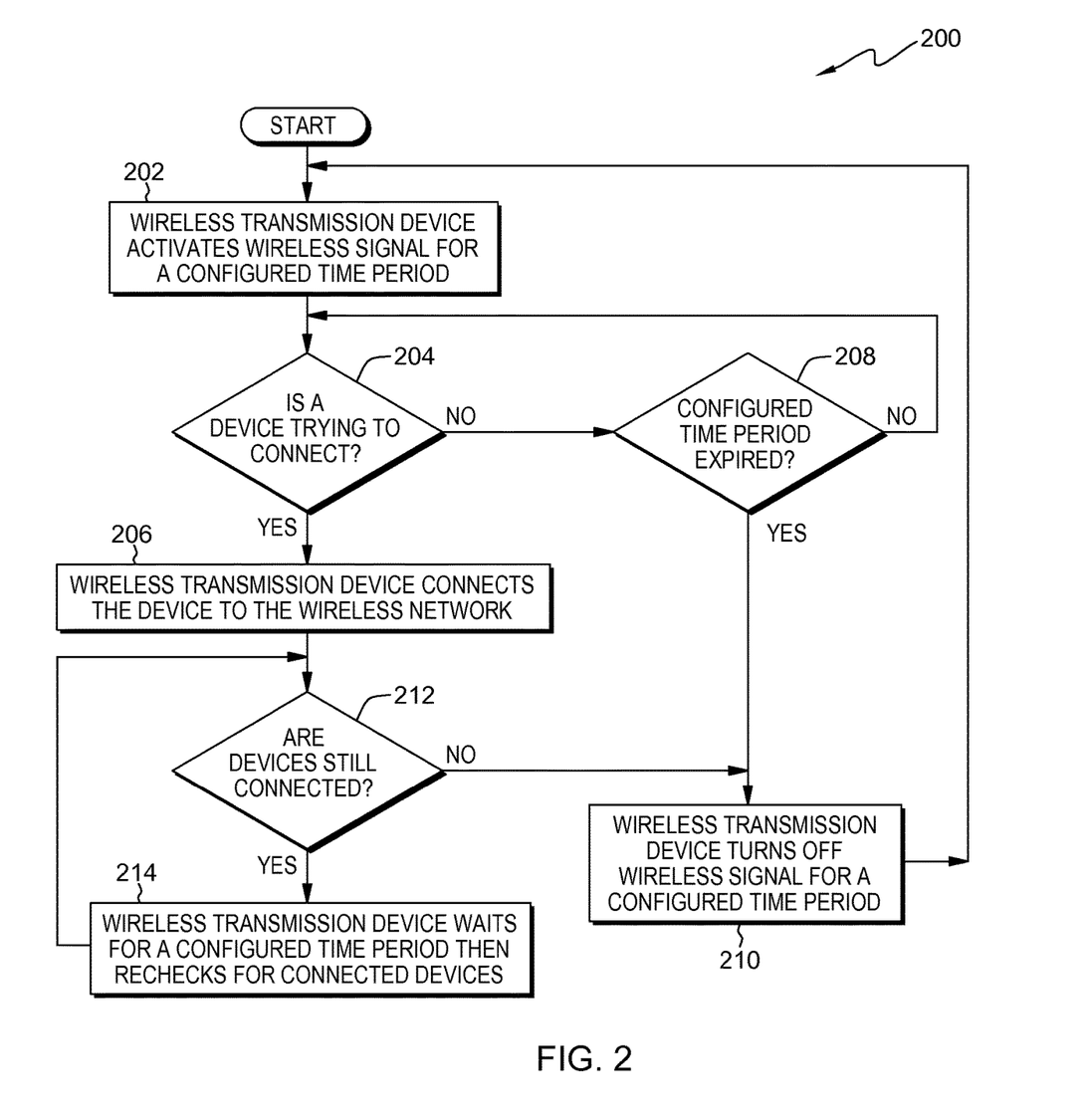
FIG. 2 is a flowchart depicting operational steps of on-demand wireless signal software, on a wireless transmission device within the wireless networking environment of FIG. 1, for activating a wireless signal to allow devices to connect to a network and deactivating the wireless signal when devices are no longer connected to the network, in an embodiment in accordance with the present invention.

FIG. 2 is a flowchart, generally designated 200, depicting operational steps of on-demand wireless signal software, on a wireless transmission device within the wireless networking environment of FIG. 1, for activating a wireless signal to allow devices to connect to a network and deactivating the wireless connectivity feature when devices are no longer connected to the network, in an embodiment in accordance with the present invention. In an example embodiment, a user configures wireless transmission device 102 to turn off the wireless signal when there are no wireless devices connected to it. The user may also configure wireless transmission device 102 to turn on, or reactivate, the wireless signal at a certain interval to determine if a device requires an Internet connection. Using the parameters configured by the user wireless transmission device 102 activates the wireless signal to detect if any devices may be attempting to connect as depicted in step 202.

In one example embodiment, a user may configure wireless transmission device 102 with one or more of the following parameters: (i) a network identifier, such as a service set identifier (SSID); (ii) a password to authenticate with the SSID, (iii) an active Wi-Fi time period, or first time period, (T1), that is used by wireless transmission device 102 to determine how long to keep the wireless signal active to allow devices to connect to network 116; (iv) an inactive wireless signal time period (T2), that is used by wireless transmission device 102 to determine how long to keep the wireless signal off after T1 expires; and (v) an active device time period (T3), that is used by wireless transmission device 102 to determine if any devices are still connected to network 116. In computer networking, a service set is a set consisting of all the devices associated with a consumer or enterprise WLAN. For example, wireless transmission device 102 activates the wireless signal after the user configured time period T2 expires, to allow a device to connect to wireless transmission device 102 within the user configured time period T1. In one example embodiment, wireless transmission device 102 may emit a Wi-Fi signal. In other example embodiments, wireless transmission device 102 may emit a Bluetooth signal. Bluetooth is a wireless technology standard for exchanging data over short distances, using short-wavelength ultra-high frequency (UHF) radio waves, from fixed and mobile devices, and building personal area networks (PANs).

In decision step 204, wireless transmission device 102 determines if a device is attempting to connect to wireless transmission device 102. Stated another way, wireless transmission device 102 determines that no wireless devices within range of wireless transmission device 102 are connected to or attempting to connect to network 116 using the wireless connectivity feature of the wireless transmission device. For example, upon activating the wireless signal, wireless transmission device 102 may either receive a request from a device to connect or periodically check to see if a device is trying to connect. If wireless transmission device 102 determines that a device is trying to connect ("Yes" branch, decision 204), wireless transmission device 102 connects the device to the wireless network as depicted in step 206. If wireless transmission device 102 determines that a device is not trying to connect ("No" branch, decision 204), wireless transmission device 102 determines if the configured time period T1 has expired as depicted in decision step 208. For example, wireless transmission device 102 may periodically check whether the configured time period T1 for the wireless signal to be active has expired.

If the user configured time period T1 has not expired ("No" branch, decision 208), wireless transmission device 102 continues to check for connecting devices and keeps the wireless signal active as depicted in FIG. 2. If the user configure time T1 has expired ("Yes" branch, decision 208), wireless transmission device 102 disables, or turns off, the wireless signal for user configured time period T2 as depicted in step 210.

In decision step 212, wireless transmission device 102 determines if there are any devices connected. Stated another way, wireless transmission device 102 determines if there is at least one wireless device connected to the wireless network connection of network 116. If there are no more connected devices ("No" branch, decision 212), wireless transmission device 102 disables, or turns off, the wireless signal for a user configured time period T2 as depicted in step 210. If there are one or more connected devices ("Yes" branch, decision 212), wireless transmission device 102 waits for a user configured time period T3 and rechecks for connected devices as depicted in step 214. In another example embodiment, a device (such as a smartphone), known to be in the proximity of wireless transmission device 102, may ping, or send a communication (using GPS, for example) to inform wireless transmission device 102 that the device requires a Wi-Fi connection, if provided with an opportunity to do so. Wireless transmission device 102 may receive the communication, also referred to as an indication, through a wired connection to network 116. Upon receiving the communication, wireless transmission device 102 reactivates the wireless signal allowing the device, and other devices, to connect.

In other example embodiments, wireless transmission device 102 may be equipped with additional low-energy hardware sensors (such as Bluetooth low energy or Near Field Communications sensors) for detecting devices in close proximity. Upon detecting a device in close proximity, and wireless transmission device 102 receives an indication from the device in close proximity for wireless connectivity, wireless transmission device 102 activates the wireless signal allowing the device, and other devices, to connect.

Figure 3:
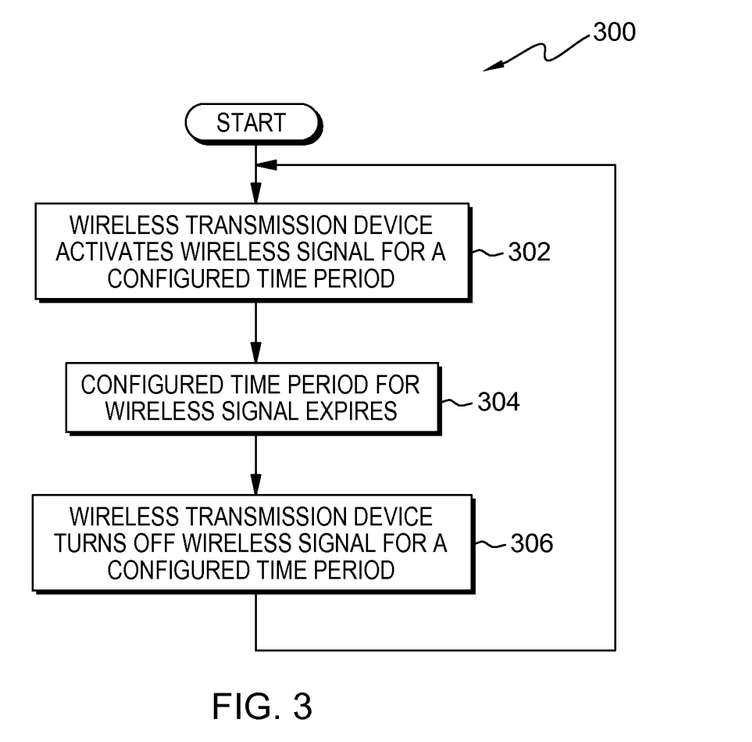
FIG. 3 is a flowchart depicting operational steps of on-demand wireless signal software, on a wireless transmission device within the wireless networking environment of FIG. 1, for activating a wireless signal to allow devices to connect to a network for a certain time period, in an embodiment in accordance with the present invention.

FIG. 3 is a flowchart, generally designated 300, depicting operational steps of on-demand wireless signal software, on a wireless transmission device within the wireless networking environment of FIG. 1, for activating a wireless signal to allow devices to connect to a network for a certain time period, in an embodiment in accordance with the present invention. In another example embodiment, a user of wireless transmission device 102 may want the wireless signal to be off during the night. The user may configure wireless transmission device 102 with one or more of the following additional parameters: (i) a time of day to switch off the wireless signal (T4), and (ii) a time of day to switch on the wireless signal (T5). Upon being configured by the user to disable the wireless signal at a specific time period T4 to T5 (e.g., from 9:00 PM to 7:00 AM), wireless transmission device 102 activates the wireless signal for the user configured duration T5, at 7:00 AM, as depicted in step 302.

In step 304, the user configured time period T5 expires and wireless transmission device 102 deactivated the wireless signal. Wireless transmission device 102 then disables, or turns off, the wireless signal for a second user configured time period T4 as depicted in step 306, and steps 302 through 306 are repeated.

In another embodiment, devices that may be connected to wireless transmission device 102 may be notified that the wireless signal may be disabled prior to the user configured time period elapsing. Upon connecting a device to network 116, wireless transmission device 102 may share the user configured settings pertaining to configured time periods T4 and T5. This would allow users of connected devices to be notified prior to user configured time period T4 expiring. In addition to the user configured time periods T4, and T5, wireless transmission device 102 may also send the current time to the connecting device to enable the device to convert the user configured time periods T4 and T5 to a common reference time. In other example embodiments, devices connected to wireless transmission device 102 may receive updated time settings pertaining to the user configured time periods T4 and T5. For example, a user of wireless transmission device 102 changes the time period T4, so the wireless signal is now disabled at 8:30 PM instead of 9:00 PM. Wireless transmission device 102 may transmit one or more updated time settings that may contain a new value indicating the time of day wireless transmission device 102 may switch off the wireless signal (e.g., T4). When a connected device approaches time T4, the connected device may warn the user of the impending loss of the wireless signal from wireless transmission device 102.

In other example embodiments, wireless transmission device 102 may learn a user's behavior and set a schedule for wireless transmission device 102 based on the learned behavior of the user. For example, wireless transmission device 102, based on a user's schedule of previous connections, may enable the wireless signal in the morning hours of 7:00 AM to 8:30 AM while the user typically is preparing for the day. Upon the user leaving for work, wireless transmission device 102 may deactivate the wireless signal until the user returns home from work at 5:30 PM. Wireless transmission device 102 may then deactivate the wireless signal at 9:30 PM when the user typically goes to sleep.

In another example embodiment, wireless transmission device 102 may use both the example embodiments of FIG. 2 and FIG. 3. For example, during the "on" time period, wireless transmission device 102 could follow the method of FIG. 2. Or, alternatively, during the "on" time period the router could remain on consistently, but follow the method of FIG. 2 during "off" hours.

In another example embodiment, wireless transmission device 102 may provide a user with a configuration option to override configured time periods in relation to preferred devices. For example, wireless transmission device 102 turns off the wireless signal only if no "preferred" devices are connected. When the user configured time period T1 expires, wireless transmission device 102 may determine if any connected devices are "preferred" devices. Upon determining that there are no "preferred" connected devices, wireless transmission device 102 may disable the wireless signal.

FIG. 4 depicts a block diagram generally designated 400, of components of the wireless transmission device executing the wireless signal on demand software, in an embodiment in accordance with the present invention. It should be appreciated that FIG. 4 provides only an illustration of one implementation and does not imply any limitations with regard to the environments in which different embodiments may be implemented. Many modifications to the depicted environment may be made.

Wireless transmission device 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

WSOD software 114 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of network 116 and computer 118. In these examples, communications unit 410 includes one or more network interface cards. Communications unit 410 may provide communications through the use of either or both physical and wireless communications links. WSOD software 114 may be downloaded to persistent storage 408 through communications unit 410.

I/O interface(s) 412 allows for input and output of data with other devices that may be connected to wireless transmission device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., WSOD software 114, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   activating, by one or more computer processors of a wireless transmission device, a wireless connectivity feature of the wireless transmission device, wherein the wireless connectivity feature is a wireless signal of the wireless transmission device;
   determining, by one or more computer processors of the wireless transmission device, that no preferred wireless devices within range of the wireless transmission device are connected to or attempting to connect to a computer network using the wireless connectivity feature of the wireless transmission device;
   responsive to determining that no preferred wireless devices within range of the wireless transmission device are connected to or attempting to connect to the network using the wireless connectivity feature of the wireless transmission device: (i) sending a notification, by one or more computer processors of the wireless transmission device, to one or more wireless devices that are connected to the network using the wireless connectivity feature of the wireless transmission device, wherein the notification indicates that the wireless connectivity feature of the wireless transmission device will be deactivated, and (ii) deactivating, by one or more computer processors of the wireless transmission device, the wireless connectivity feature of the wireless transmission device;
   receiving, by one or more computer processors of the wireless transmission device, a request to reactivate the wireless connectivity feature of the wireless transmission device, wherein the request originates from a preferred wireless device that requires the wireless connectivity feature of the wireless transmission device, and wherein the request is received by the wireless transmission device from the preferred wireless device via a means other than the wireless connectivity feature; and
   responsive to receiving the request to reactivate the wireless connectivity feature of the wireless transmission device, reactivating, by one or more computer processors of the wireless transmission device, the wireless connectivity feature of the wireless transmission device.

2. The computer-implemented method of claim 1, further comprising:
   further deactivating, by one or more computer processors of the wireless transmission device, the wireless connectivity feature of the wireless transmission device after a first time period; and
   further reactivating, by one or more computer processors of the wireless transmission device, the wireless connectivity feature of the wireless transmission device after a second time period.

3. The computer-implemented method of claim 1, further comprising:
   further deactivating and reactivating, by one or more computer processors of the wireless transmission device, the wireless connectivity feature of the wireless transmission device based on a schedule configured by a user of a wireless device that has previously connected to the network using the wireless connectivity feature of the wireless transmission device.

4. The computer-implemented method of claim 1, further comprising:
   responsive to determining that at least one wireless device within range of the wireless transmission device is connected to or attempting to connect to the computer network using the wireless connectivity feature of the wireless transmission device, determining, by one or more computer processors of the wireless transmission device, for the wireless connectivity feature of the wireless transmission device to remain active for a period of time.

5. The computer-implemented method of claim 1, further comprising:
   further deactivating and reactivating, by one or more computer processors of the wireless transmission device, the wireless connectivity feature of the wireless transmission device based on a learned behavior of when a user typically requires wireless network connectivity.

6. The computer-implemented method of claim 1, wherein the means other than the wireless connectivity feature is a low-energy wireless signal of the wireless transmission device, and wherein receiving the request to reactivate the wireless connectivity feature of the wireless transmission device from the preferred wireless device via the low-energy wireless signal indicates that the preferred wireless device is within a certain proximity of the wireless transmission device.

7. A computer program product comprising:
   one or more computer readable storage media and program instructions stored on the one or more computer readable storage media, the program instructions executable by one or more computer processors, the stored program instructions comprising:
   program instructions to activate, by a wireless transmission device, a wireless connectivity feature of the wireless transmission device, wherein the wireless connectivity feature is a wireless signal of the wireless transmission device;

program instructions to determine, by the wireless transmission device, that no preferred wireless devices within range of the wireless transmission device are connected to or attempting to connect to a computer network using the wireless connectivity feature of the wireless transmission device;

program instructions to, responsive to determining that no preferred wireless devices within range of the wireless transmission device are connected to or attempting to connect to the network using the wireless connectivity feature of the wireless transmission device: (i) send a notification, by the wireless transmission device, to one or more wireless devices that are connected to the network using the wireless connectivity feature of the wireless transmission device, wherein the notification indicates that the wireless connectivity feature of the wireless transmission device will be deactivated, and (ii) deactivate, by the wireless transmission device, the wireless connectivity feature of the wireless transmission device;

program instructions to receive, by the wireless transmission device, a request to reactivate the wireless connectivity feature of the wireless transmission device, wherein the request originates from a preferred wireless device that requires the wireless connectivity feature of the wireless transmission device, and wherein the request is received by the wireless transmission device from the preferred wireless device via a means other than the wireless connectivity feature; and program instructions to, responsive to receiving the request to reactivate the wireless connectivity feature of the wireless transmission device, reactivate, by the wireless transmission device, the wireless connectivity feature of the wireless transmission device.

8. The computer program product of claim 7, the stored program instructions further comprising:

program instructions to further deactivate, by the wireless transmission device, the wireless connectivity feature of the wireless transmission device after a first time period; and program instructions to further reactivate, by the wireless transmission device, the wireless connectivity feature of the wireless transmission device after a second time period.

9. The computer program product of claim 7, the stored program instructions further comprising:

program instructions to further deactivate and reactivate, by the wireless transmission device, the wireless connectivity feature of the wireless transmission device based on a schedule configured by a user of a wireless device that has previously connected to the network using the wireless connectivity feature of the wireless transmission device.

10. The computer program product of claim 7, the stored program instructions further comprising:

program instructions to, responsive to determining that at least one wireless device within range of the wireless transmission device is connected to or attempting to connect to the computer network using the wireless connectivity feature of the wireless transmission device, determine, by the wireless transmission device, for the wireless connectivity feature of the wireless transmission device to remain active for a period of time.

11. The computer program product of claim 7, the stored program instructions further comprising:

program instructions to further deactivate and reactivate, by the wireless transmission device, the wireless connectivity feature of the wireless transmission device based on a learned behavior of when a user typically requires wireless network connectivity.

12. The computer program product of claim 7, wherein the means other than the wireless connectivity feature is a low-energy wireless signal of the wireless transmission device, and wherein receiving the request to reactivate the wireless connectivity feature of the wireless transmission device from the preferred wireless device via the low-energy wireless signal indicates that the preferred wireless device is within a certain proximity of the wireless transmission device.

13. A computer system comprising:

one or more computer processors;

one or more computer readable storage media;

program instructions stored on the computer readable storage media for execution by at least one of the one or more processors, the stored program instructions comprising:

program instructions to activate, by the wireless transmission device, a wireless connectivity feature of the wireless transmission device, wherein the wireless connectivity feature is a wireless signal of the wireless transmission device;

program instructions to determine, by the wireless transmission device, that no preferred wireless devices within range of the wireless transmission device are connected to or attempting to connect to a computer network using the wireless connectivity feature of the wireless transmission device;

program instructions to, responsive to determining that no preferred wireless devices within range of the wireless transmission device are connected to or attempting to connect to the network using the wireless connectivity feature of the wireless transmission device: (i) send a notification, by the wireless transmission device, to one or more wireless devices that are connected to the network using the wireless connectivity feature of the wireless transmission device, wherein the notification indicates that the wireless connectivity feature of the wireless transmission device will be deactivated, and (ii) deactivate, by the wireless transmission device, the wireless connectivity feature of the wireless transmission device;

program instructions to receive, by the wireless transmission device, a request to reactivate the wireless connectivity feature of the wireless transmission device, wherein the request originates from a preferred wireless device that requires the wireless connectivity feature of the wireless transmission device, and wherein the request is received by the wireless transmission device from the preferred wireless device via a means other than the wireless connectivity feature; and program instructions to, responsive to receiving the request to reactivate the wireless connectivity feature of the wireless transmission device, reactivate, by the wireless transmission device, the wireless connectivity feature of the wireless transmission device.

14. The computer system of claim 13, the stored program instructions further comprising:

program instructions to further deactivate, by the wireless transmission device, the wireless connectivity feature of the wireless transmission device after a first time period; and program instructions to further reactivate, by the wireless transmission device, the wireless connectivity feature of the wireless transmission device after a second time period.

15. The computer system of claim 13, the stored program instructions further comprising:

program instructions to further deactivate and reactivate, by the wireless transmission device, the wireless connectivity feature of the wireless transmission device based on a schedule configured by a user of a wireless device that has previously connected to the network using the wireless connectivity feature of the wireless transmission device.

16. The computer system of claim 13, the stored program instructions further comprising:

program instructions to, responsive to determining that at least one wireless device within range of the wireless transmission device is connected to or attempting to connect to the computer network using the wireless connectivity feature of the wireless transmission device, determine, by the wireless transmission device, for the wireless connectivity feature of the wireless transmission device to remain active for a period of time.

17. The computer system of claim 13, the stored program instructions further comprising:

program instructions to further deactivate and reactivate, by the wireless transmission device, the wireless connectivity feature of the wireless transmission device based on a learned behavior of when a user typically requires wireless network connectivity.

18. The computer system of claim 13, wherein the means other than the wireless connectivity feature is a low-energy wireless signal of the wireless transmission device, and wherein receiving the request to reactivate the wireless connectivity feature of the wireless transmission device from the preferred wireless device via the low-energy wireless signal indicates that the preferred wireless device is within a certain proximity of the wireless transmission device.

* * * * *